United States Patent [19]

Geerlings et al.

[11] Patent Number: 5,508,742
[45] Date of Patent: Apr. 16, 1996

[54] COLOR VIDEO CAMERA APPARATUS USING A CD INCLUDES A MATRIX CIRCUIT HAVING MATRIX COEFFICIENTS ADJUSTABLE INDEPENDENCE ON THE COLOR SIGNALS

[75] Inventors: Jurgen H. T. Geerlings, Vienna, Austria; Kazumasa Igarashi; Hiroshi Kitagawa, both of Tokyo, Japan

[73] Assignee: U.S. Philips Corporation, New York, N.Y.

[21] Appl. No.: 219,052

[22] Filed: Mar. 29, 1994

[30] Foreign Application Priority Data

Apr. 5, 1993 [JP] Japan .................................. 5-101978
Jan. 19, 1994 [JP] Japan .................................. 6-020003

[51] Int. Cl.⁶ .................................................. H04N 9/07
[52] U.S. Cl. .......................................... 348/279; 348/272
[58] Field of Search ................................. 348/266, 272, 348/279, 638, 642, 713; H04N 9/07, 9/67, 9/73

[56] References Cited

U.S. PATENT DOCUMENTS 4,620,222 10/1986 Baba et al. ........................... 348/279
5,136,370 8/1992 Chi ...................................... 348/279

*Primary Examiner*—James J. Groody
*Assistant Examiner*—Cheryl Cohen
*Attorney, Agent, or Firm*—Edward W. Goodman

[57] ABSTRACT

There is provided a color video camera apparatus (10) which includes an image sensor (11) having a plurality of pixel elements for converting an optical image into an electric image signal, a color filter (12) arranged on the image sensor and having a predetermined mosaic pattern of different colors including complementary colors, an image signal processing circuit (15) for processing the electric image signal to produce at least first and second color difference signals (2R–G) and (2B–G), a variable coefficient generator (20) for generating first and second coefficients (a) and (b) each of which is variable in dependence on the first and second color difference signals, first and second multipliers (19 and 22) for multiplying the first and second color difference signals respectively by the second and first coefficients, and first and second adders (18 and 21) for adding outputs of the second and first multipliers to the first and second color difference signals to generate objective third and fourth color difference signals [(R–Y) and (B–Y)].

6 Claims, 3 Drawing Sheets

COLOR VIDEO CAMERA APPARATUS USING A CD INCLUDES A MATRIX CIRCUIT HAVING MATRIX COEFFICIENTS ADJUSTABLE INDEPENDENCE ON THE COLOR SIGNALS

BACKGROUND OF THE INVENTION

1. Field of the Invention

This invention relates generally to a color video camera apparatus comprising a solid-state image sensor with a complementary color mosaic filter and, more particularly, to a variable color matrix circuit for use in such a video camera apparatus to obtain a higher color fidelity.

2. Description of the Related Art

In the conventional color video camera apparatus with a single CCD image sensor, a complementary color mosaic filter is generally used for generating two color difference signals in addition to a luminance signal. For example, in the case where a complementary color mosaic filter with four colors Ye, Mg, Cy and Gr is used (where Ye represents yellow, Mg magenta, Cy cyan and Gr green), adjacent odd-numbered and even-numbered horizontal lines are simultaneously read to alternately produce (2R−G) and (2B−G) color difference signals in an odd-numbered field. In an even-numbered field, adjacent even-numbered and odd-numbered horizontal lines are simultaneously read to alternately produce (2B−G) and (2R−G) color difference signals. Two concurrent color difference signals (2B−G) and (2R−G) are obtained from the above alternate color difference signals by means of line delay circuits and switches. The thus obtained color difference signals are then subjected to the following matfixing operation to produce (R−Y) and (B−Y) color difference signals which can be used to produce a standard color composite signal.

$$R-Y = 2R-G + a(2B-G)$$

$$B-Y = 2B-G + b(2R-G)$$

where a and b are predetermined constants or matfixing coefficients.

The inventor found that the above matfixing operation is not satisfactory enough to obtain a higher color fidelity.

SUMMARY OF THE INVENTION

It is, inter alia, an object of the present invention to provide a color video camera apparatus with an improved color matrix circuit by which a much higher color fidelity can be obtained. To this end, a first aspect of the invention provides a color video camera apparatus which comprises an image sensor (11) having a plurality of pixel elements for converting an optical image into an electric image signal, a color filter (12) arranged on the image sensor and having a predetermined mosaic pattern of different colors including complementary colors, an image signal processing means (15) for processing the electric image signal to produce at least first (2R−G) and second (2B−G) color difference signals, a coefficient generator means (20) for generating first (a) and second (b) coefficients, first (19) and second (22) multiplier means for multiplying the first (2R−G) and second (2B−G) color difference signals, respectively, by the second (b) and first (a) coefficients, and first (18) and second (21) adder means for adding outputs of the second (22) and first (19) multiplier means to the first (2R−G) and second (2B−G) color difference signals to generate third (R−Y) and fourth (B−Y) color difference signals, respectively, wherein the coefficient generator means (20) is a variable coefficient generator means for generating said first (a) and second (b) coefficients variably in dependence on the first (2R−G) and second (2B−G) color difference signals. A second aspect of the invention provides a signal processor for processing first (2R−G) and second (2B−G) color difference signals comprising a coefficient generator means (20) for generating first (a) and second (b) coefficients, first (19) and second (22) multiplier means for multiplying the first (2R−G) and second (2B−G) color difference signals, respectively, by the second (b) and first (a) coefficients, and first (18) and second (21) adder means for adding outputs of the second (22) and first (19) multiplier means to the first (2R−G) and second (2B−G) color difference signals to generate signals third (R−Y) and fourth (B−Y) color difference signals, respectively, wherein the coefficient generator means (20) is a variable coefficient generator means for generating said first (a) and second (b) coefficients variably in dependence on the first (2R−G) and second (2B−G) color difference signals.

The variable coefficient generator means may be arranged comprising a selector which selects one of a plurality of coefficients in accordance with the first and second color difference signals.

With the above structure, the coefficients used in the matrixing operation for producing the objective third and fourth color difference signal from the first and second color difference signals can be adjusted to optimum values with respect to each of different colors. It is therefore possible to obtain a higher color fidelity as its results.

According to an embodiment of the present invention, at least one of the image signal processing means, the first and second multiplier means, the first and second adder means and the variable coefficient generator means may be constructed to operate digitally.

These and other aspects of the invention will be apparent from and elucidated with reference to the embodiments described hereinafter.

DESCRIPTION OF THE PREFERRED EMBODIMENTS

Figure 1:
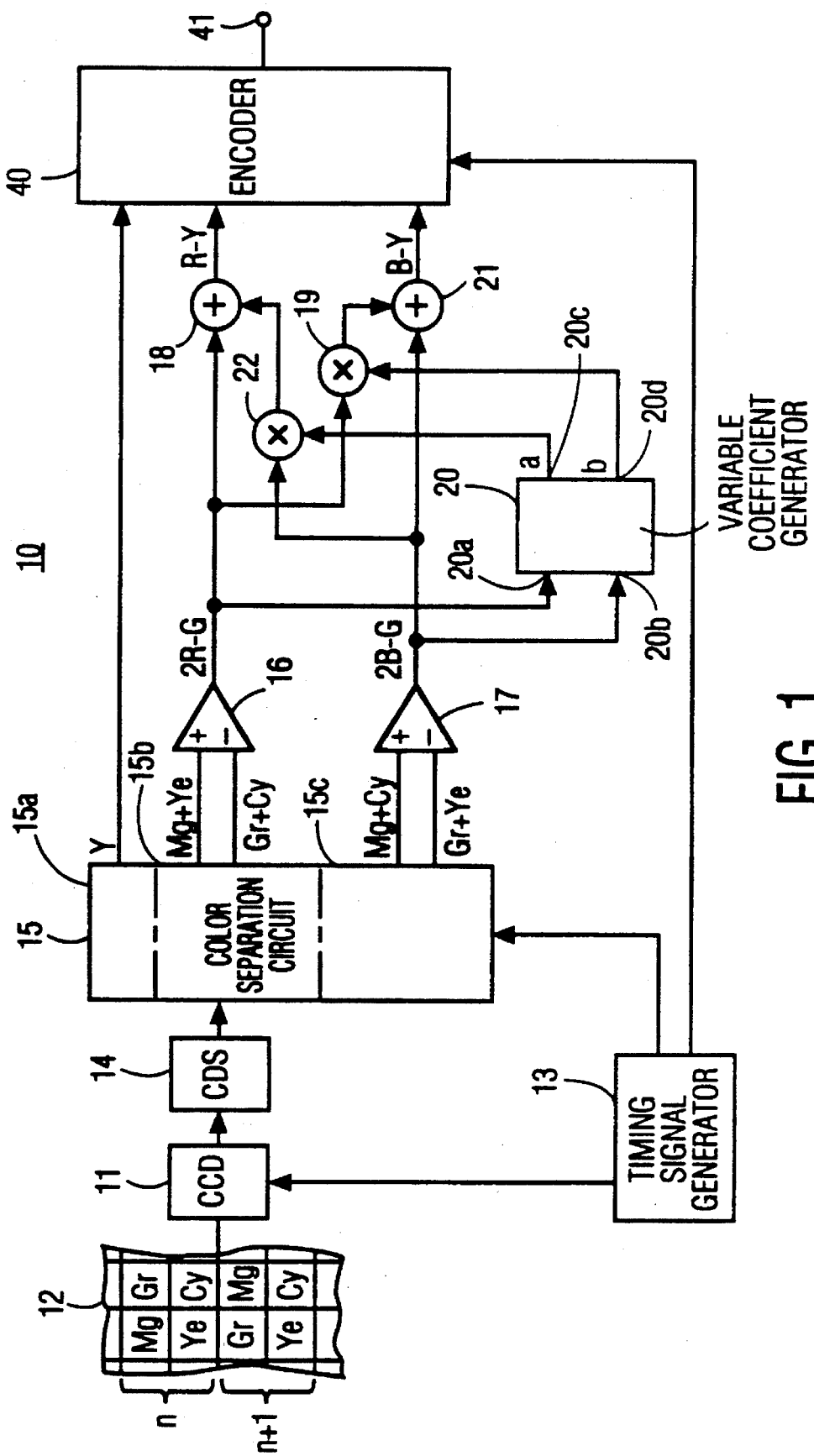
FIG. 1 is a block diagram of a principal portion of a color video camera apparatus provided in accordance with a first embodiment of the present invention.

Referring now to FIG. 1, there is shown a principal portion of a color video camera apparatus 10 according to a first embodiment of the invention. This camera apparatus 10 comprises a CCD image sensor 11 of the conventional type on which a complementary color mosaic filter 12 is provided. In FIG. 1, only a portion of the filter 12 is illustrated in an enlarged manner. This filter comprises a mosaic pattern of four colors Mg (magenta), Gr (green), Ye (yellow) and Cy (cyan). More specifically, the filter 12 comprises, in registry with pixels on each of the first, fifth, ninth, . . . horizontal lines of the CCD image sensor 11, color filter elements arranged in the order of Mg, Gr, Mg, Gr, . . . . This filter also comprises, in registry with pixels on each of the even-numbered horizontal lines, color filter elements arranged in the order of Ye, Cy, Ye, Cy, . . . . The color filter elements on the third, seventh, eleventh, . . . horizontal lines are one pixel shifted in the horizontal direction with respect to those on the first, fifth, ninth, . . . horizontal lines.

The CCD image sensor 11 operates in response to a timing signal from a timing signal generator 13 in such a way that in an odd-numbered field, pixels on each pair of adjacent odd and even-numbered horizontal lines are read horizontally in succession but vertically simultaneously. More specifically, in the case of the nth pair of odd and even numbered horizontal lines, the color pixels corresponding to Mg and Ye are simultaneously read to produce (Mg+Ye) and then the color pixels corresponding to Gr and Cy are simultaneously read to produce (Gr+Cy). Similar reading operations are repeated with respect this nth pair of horizontal lines until all the remaining pixels are read. In the case of (n+1)th pair of odd and even-numbered horizontal lines, the color pixels corresponding to Gr and Ye are simultaneously read to produce (Gr+Ye) and then the color pixels corresponding to Mg and Cy are simultaneously read to produce (Mg+Cy). Similar reading operations are repeated with respect to this (n+1)th pair of horizontal lines until all the remaining pixels are read. In an even-numbered field, pixels on each pair of adjacent even and odd-numbered horizontal lines are read horizontally in succession but vertically simultaneously in a manner similar to the above.

The picture-information signal obtained by reading the pixels of the CCD image sensor 11 in the above-described manner is supplied to a correlated double sampling (CDS) circuit 14 of the conventional type to reduce noises contained therein. An output of this CDS circuit 14 is supplied to a color separation circuit 15. This color separation circuit comprises a luminance signal processing section 15a for deriving a luminance signal Y from the output signal of the CDS circuit 14. This luminance signal processing section is of the conventional type and comprises, for example, a low-pass filter and a delay circuit (both not shown). The color separation circuit 15 also comprises a first color signal processing section 15b driven by the timing signal generator 13 for deriving a first pair of concurrent color signals (Mg+Ye) and (Gr+Cy). This color signal processing section is of the conventional type and comprises, for example, a sample-and-hold circuit, a band-pass filter, a line memory and a switch circuit (not shown). The color separation circuit 15 further comprises a second color signal processing section 15c driven by the timing signal generator 13 for deriving a second pair of concurrent color signals (Mg+Cy) and (Gr+Ye). This color signal processing section is substantially of the same structure as the color signal processing section 15b.

The color signals (Mg+Ye) and (Gr+Cy) from the first color signal processing section 15b are supplied, respectively to positive and negative input terminals of a first subtracter 16 to produce a first color difference signal (2R−G) at its output terminal. Similarly, the color signals (Mg+Cy) and (Gr+Ye) from the second color signal processing section 15c are supplied, respectively, to positive and negative input terminals of a second subtracter 17 to produce a second color difference signal (2B−G) at its output terminal. The first color difference signal (2R−G) is supplied to a first input terminal of a first adder 18, a first input terminal of a first multiplier 19 and a first input terminal 20a of a variable coefficient generator 20. The second color difference signal (2B−G) is supplied to a first input terminal of a second adder 21, a first input terminal of a second multiplier 22 and a second input terminal 20b of the variable coefficient generator 20.

The variable coefficient generator 20 is provided for generating at its first and second output terminals 20c and 20d coefficient signals a and b, respectively, which vary in accordance with magnitudes of the color difference signals (2R−G) and (2B−G). This variable coefficient generator may be constructed as shown in FIG. 2.

Figure 2:
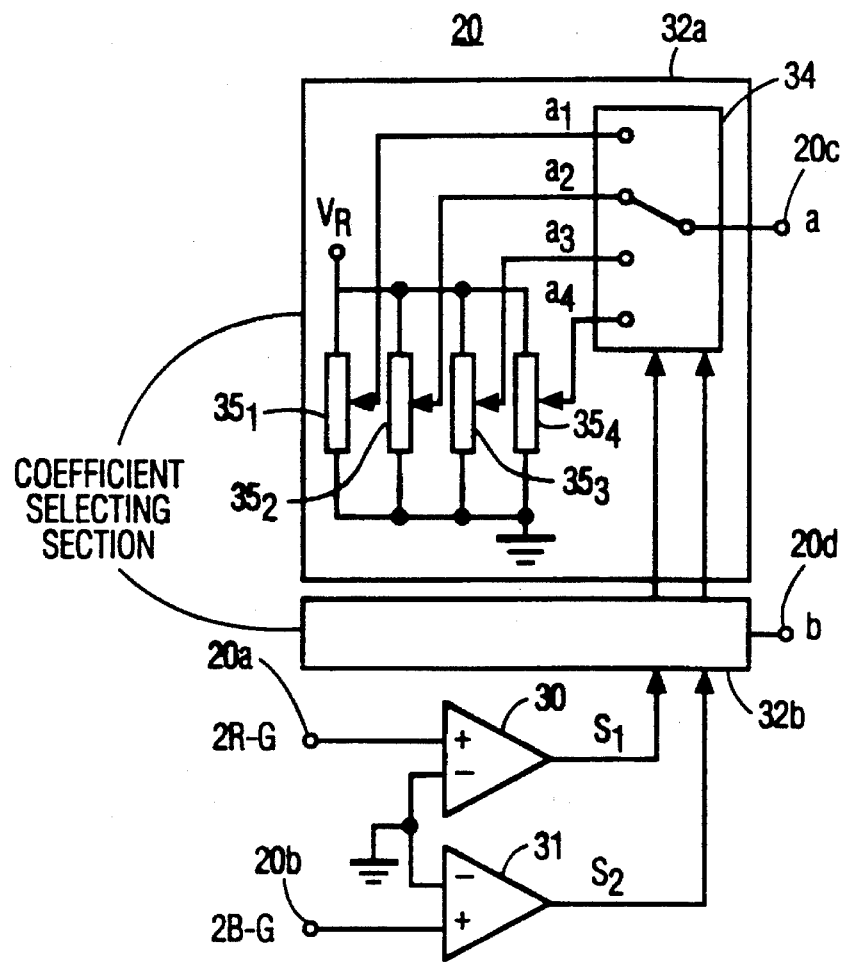
FIG. 2 is a circuit diagram of a variable coefficient generator in the color video camera apparatus of FIG. 1.

In FIG. 2, the first color difference signal (2R−G) received at the input terminal 20a is supplied to a positive input terminal of a first comparator 30 whose negative input terminal is grounded. Similarly, the second color difference signal (2B−G) received at the input terminal 20b is supplied to a positive input terminal of a second comparator 31 whose negative input terminal is grounded. Each of these comparators outputs a high signal when the input signal at the positive input terminal is higher than that at the negative input terminal and otherwise outputs a low signal. Output signals $S_1$ and $S_2$ from the first and second comparators 30 and 31 are supplied to first and second coefficient selecting sections 32a and 32b which have similar circuit structures. The first coefficient selecting section 32a comprises a selector 34 for selecting one out of four inputs in accordance with the signals $S_1$ and $S_2$. The four input terminals of this selector are connected, respectively, to four potentiometers $35_1$, $35_2$, $35_3$, and $35_4$ which produce from a reference potential VR four coefficient signals $a_1$, $a_2$, $a_3$ and $a_4$ capable of bearing different potentials, respectively. The selector 34 selects the coefficient signal $a_1$ when both signals $S_1$ and $S_2$ are low, the coefficient signal $a_2$ when the signals $S_1$ and $S_2$ are low and high, respectively, the coefficient signal $a_3$ when the signals $S_1$ and $S_2$ are high and low, respectively, and the coefficient signal $a_4$ when the signals $S_1$ and $S_2$ are both high. The thus selected coefficient signal is supplied from an output terminal of the selector 34 to the first output terminal 20c of this variable coefficient generator 20 as the coefficient signal a.

The second coefficient selecting section 32b is substantially the same in structure as the first coefficient selecting section 32a and outputs a signal, which has been selected from four coefficient signals $b_1$, $b_2$, $b_3$ and $b_4$ in accordance with the signals $S_1$ and $S_2$, to the second output terminal 20d of this variable coefficient generator 20 as the aforesaid coefficient signal b.

Referring again to FIG. 1, the coefficient signals a and b fed from the variable coefficient generator 20 are supplied to a second input terminal of the second multiplier 22 and a second input terminal of the first multiplier 19, respectively. Output signals of the multipliers 22 and 19 are supplied to second input terminals of the first and second adders 18 and 21, respectively. Output signals from the adders 18 and 21, which substantially correspond, respectively, to (R−Y) and (B−Y) color difference signals, are supplied together with the luminance signal Y from the luminance signal processing section 15a, to an encoder 40. This encoder effects an encoding operation on the luminance signal Y and the two color difference signals (R−Y) and (B−Y) to produce at an output terminal 41 a standard color composite signal, such as an NTSC color composite signal.

Figure 3:
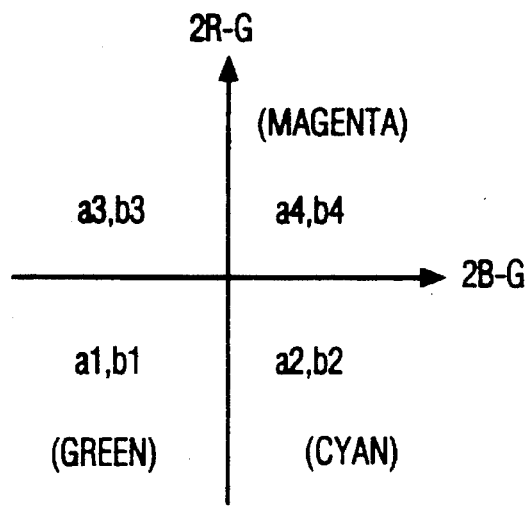
FIG. 3 is a color coordinate system showing the relation between the color difference signals and the matfixing coefficients.

The circuit shown in FIGS. 1 and 2 operates as follows. When the pixels on the CCD image sensor 11 are read in the above-described manner, the first pair of color signals (Mg+Ye) and (Gr+Cy) and the second pair of color signals (Mg+Cy) and (Gr+Ye) appear at the output terminals of the first and second color signal processing sections 15b and 15c, respectively. At the first subtracter 16, the color signal (Gr+Cy) is subtracted from the color signal (Mg+Ye) whereby the color difference signal (2R–G) is produced. Similarly, the color signal (Gr+Ye) is subtracted from the color signal (Mg+Cy) at the second subtracter 17 whereby the color difference signal (2B–G) is produced. The color difference signal (2R–G) is first multiplied by the coefficient b at the multiplier 19 and then added to the color difference signal (2B–G) at the adder 21 whereby the color difference signal (B–Y) is formed, while the color difference signal (2B–G) is first multiplied by the coefficient a at the multiplier 22 and then added to the color difference signal (2R–G) at the adder 18 whereby the color difference signal (R–Y) is formed. In this case, the coefficient a used for the derivation of the color difference signal (R–Y) is determined in dependence on the color difference signals (2R–G) and (2B–G) and therefore the color difference signal (R–Y) can be corrected more precisely and independently with respect to each color. More specifically, when the picture color is green, which means that the color difference signals (2R–G) and (2B–G) are both negative and reside in the third quadrant of a color coordinate system shown in FIG. 3, the first coefficient $a_1$ is selected as the coefficient a. Therefore, the color difference signal (R–Y) can be more precisely and independently adjusted with respect to this green color in accordance with the coefficient $a_1$. This color difference signal (R–Y) can also be corrected more precisely and independently with respect to each of other colors such as magenta and cyan in the first and fourth quadrants in a manner described above for green. The same is true of the color difference signal (B–Y).

The thus corrected color difference signals (R–Y) and (B–Y) are supplied together with the luminance signal Y to the encoder 40 which can therefore form a more precisely adjusted standard color composite signal.

Figure 4:
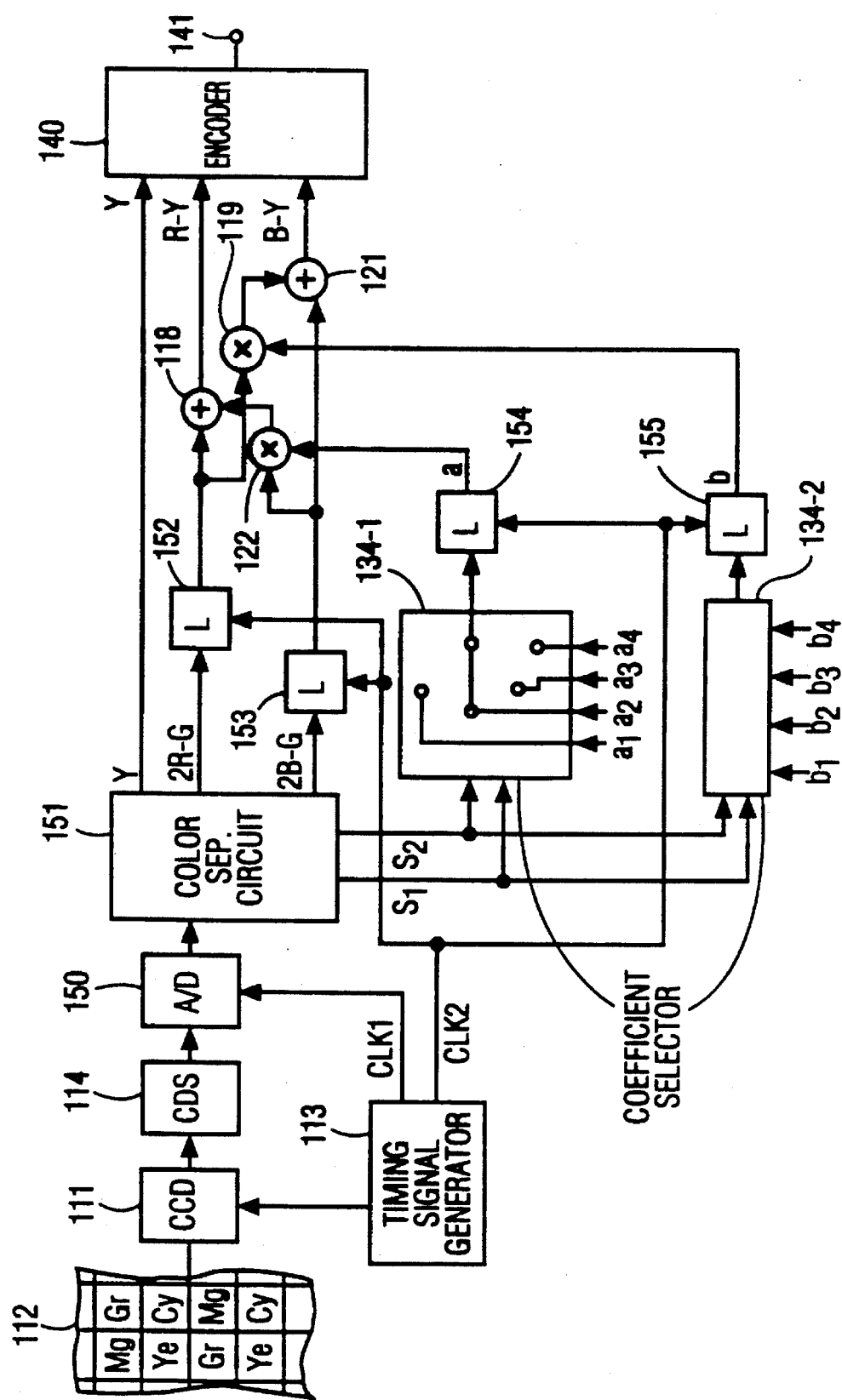
FIG. 4 is a block diagram of a principal portion of a color video camera apparatus provided in accordance with a second embodiment of the invention.

A second embodiment of the color video camera apparatus according to the invention will now be described with reference to FIG. 4, wherein constituent elements corresponding to those shown in FIG. 1 are designated by reference numbers which are greater by one hundred than the corresponding ones.

This embodiment is specifically designed to process the picture-information signal in a digital fashion. In FIG. 4, an analog output signal of a CDS circuit 114 is fed to an analog-to-digital (A/D) converter 150. This A/D converter converts the supplied analog signal, which is the color picture-information signal, into a digital signal at a time interval determined by a clock signal CLK1 fed from a timing signal generator 113. The thus obtained digital picture-information signal is supplied to a digital signal processor 151. This signal processor is so programed as to implement at least the functions of the color separation circuit 15 and the comparators 16 and 17 of FIG. 1 and the function of the comparators 30 and 31 of FIG. 2. Thus, the digital signal processor 151 outputs a luminance signal Y, first and second color difference signals (2R–G) and (2B–G) and signals $S_1$ and $S_2$.

The color difference signals (2R–G) and (2B–G) are supplied to latches 152 and 153, respectively. These latches temporarily store the respective color difference signals (2R–G) and (2B–G) in response to a clock signal CLK2 which is fed from the timing signal generator 113. The latch 152 supplies the stored signal to a digital adder 118 and a digital multiplier 119, while the latch 153 supplies the stored signal to a digital adder 121 and a digital multiplier 122. The signals $S_1$ and $S_2$ from the digital signal processor 151 are both supplied to selectors 134-1 and 134-2. The selector 134-1 selects one of four coefficients $a_1$, $a_2$, $a_3$ and $a_4$ in accordance with the signals $S_1$ and $S_2$. Similarly, the selector 134-2 selects one of four coefficients $b_1$, $b_2$, $b3_3$ and $b_4$ in accordance with the signals $S_1$ and $S_2$. The coefficient selected by the selector 134-1 is temporarily stored in a latch 154 in response to the clock signal CLK2 and outputted therefrom as the coefficient a, while the coefficient selected by the selector 134-2 is temporarily stored in a latch 155 in response to the clock signal CLK2 and outputted therefrom as the coefficient b. Each of the coefficients $a_1$ to $a_4$ and $b_1$ to $b_4$ is a variable digital value which may be given by an appropriate means such as a ROM. The coefficients a and b from the latches 154 and 155 are supplied to the multipliers 122 and 119, respectively. Output signals from the adders 118 and 121, which are color difference signals (R–Y) and (B–Y), are supplied together with the luminance signal Y from the digital signal processor 151 to a digital encoder 140, which forms from the inputted three signals a digital color composite video signal in the known manner and outputs it from an output terminal 141.

The operation of this embodiment is substantially the same as that of the first embodiment of FIG. 1, but the signal processing is done digitally after the A/D converter 150.

Table 1 given below shows values of the coefficients $a_1$ to $a_4$ and $b_1$ to $b_4$ which were experimentally used in the above embodiment for the cases where the color temperatures are 3,200K and 4,400K, respectively, wherein a CCD of the Matsushita Model MN3752 (710H, ½", NTSC) was used as the CCD image sensor 111.

TABLE 1

| | color temperature | |
|---|---|---|
| coefficient | 3,200K | 4,400K |
| $a_1$ | 20/64 | 8/64 |
| $b_1$ | –2/64 | –10/64 |
| $a_2$ | –13/64 | –4/64 |
| $b_2$ | 8/64 | 5/64 |
| $a_3$ | –13/64 | –4/64 |
| $b_3$ | –2/64 | –10/64 |
| $a_4$ | –13/64 | –4/64 |
| $b_4$ | 8/64 | 5/64 |

Although the selectors 134-1 and 134-2, the latches 152 to 155, the adders 118 and 121, the multipliers 119 and 122 and the encoder 140 are shown as separate circuit elements in the above embodiment, these elements can be combined with the digital signal processor 151 into a single digital signal processor. In this case, all the functions of the selectors, latches, adders, multipliers and encoder should be programmed in the digital signal processor.

It should be noted that the scope of the present invention is not limited to the above-described embodiments. For example, this invention can also be applied to a color video camera apparatus which employs a color mosaic filter having a different color filter element arrangement.

What is claimed is:

1. A color video camera apparatus which comprises:

an image sensor having a plurality of pixel elements for converting an optical image into an electric image signal;

a color filter arranged on the image sensor and having a predetermined mosaic pattern of different colors including complementary colors;

an image signal processing means for processing the electric image signal to produce at least a first color difference signal and a second color difference signal;

a coefficient generator means for generating a first coefficient and a second coefficient;

first and second multiplier means for multiplying the first and second color difference signals, respectively, by the second and first coefficients; and first adder means for adding an output of the second multiplier means to the first color difference signal to generate a third color difference signal, and second adder means for adding an output of the first multiplier means to the second color difference signal to generate a fourth color difference signal, wherein the coefficient generator means is a variable coefficient generator means for generating said first and second coefficients variably in dependence on the first and second color difference signals.

2. A color video camera apparatus according to claim 1, characterized in that said variable coefficient generator means comprises, for generating each of the first and second coefficients, a signal generator for generating a plurality of coefficient signals; and a selector having control input means for selectively outputting one of said plurality of coefficient signals as the corresponding one of the first and second coefficients, said control input means being coupled to receive the first and second color difference signals.

3. A color video camera apparatus according to claim 1, characterized in that the color filter comprises filter elements of magenta, green, yellow and cyan, the first and second color difference signals being (2R–G) and (2B–G), respectively, and the third and fourth color difference signals being (R–Y) and (B–Y), respectively, where R, G and B represent colors of red, green and blue, respectively, and Y represents a luminance.

4. A color video camera apparatus according to claim 1, characterized in that at least one of the image signal processing means, the first and second multiplier means, the first and second adder means and said variable coefficient generator means is constructed to operate digitally.

5. A signal processor for processing first and second color difference signals comprising:

a coefficient generator means for generating first and second coefficients;

first and second multiplier means for multiplying the first and second color difference signals, respectively, by the second and first coefficients;

first adder means for adding an output of the second multiplier means to the first color difference signal to generate a third color difference signal; and second adder means for adding an output of the first multiplier means to the second color difference signal to generate a fourth color difference signal, wherein the coefficient generator means is a variable coefficient generator means for generating said first and second coefficients variably in dependence on the first and second color difference signals.

6. A signal processor according to claim 5, characterized in that said variable coefficient generator means comprises, for generating each of the first and second coefficients, a signal generator for generating a plurality of coefficient signals and a selector having control input means for selectively outputting one of said plurality of coefficient signals as the corresponding one of the first and second coefficients, said control input means being coupled to receive the first and second color difference signals.

\* \* \* \* \*